United States Patent [19]
Schulz

[11] Patent Number: 5,249,928
[45] Date of Patent: Oct. 5, 1993

[54] FIXED PITCH PROPELLER

[76] Inventor: William J. Schulz, 152 Dibble Hill, West Cornwall, Conn. 06796

[21] Appl. No.: 762,508

[22] Filed: Sep. 19, 1991

[51] Int. Cl.$^5$ .............................................. B63H 1/26
[52] U.S. Cl. .................... 416/223 R; 416/234; 416/DIG. 2; 416/DIG. 5
[58] Field of Search ............ 416/223 R, 234, 238, 416/242, DIG. 2, DIG. 5

[56] References Cited
U.S. PATENT DOCUMENTS

| | | | |
|---|---|---|---|
| 3,173,490 | 3/1965 | Stuart | 416/223 R |
| 3,829,240 | 8/1974 | Edenborough et al. | 416/223 R |
| 5,035,377 | 7/1991 | Buchelt | 416/223 R X |
| 5,035,577 | 7/1991 | Damongeot | 416/223 R |

Primary Examiner—Edward K. Look
Assistant Examiner—Todd Mattingly
Attorney, Agent, or Firm—McCormick, Paulding & Huber

[57] ABSTRACT

A fixed pitch propeller has blades that are not solely dependent on the blade angle dictated by the helical path of the blade tip. An outboard portion of the blade has a range of blade angles that are relatively flat to operate most efficiently at lower aircraft speeds. An inboard portion of the blade has a range of blade angles that are relatively high pitched to allow efficient operation at higher aircraft speeds 4 Claims, 4 Drawing Sheets

| PERCENT STATION | REAR FACE ANGLE | CHORD |
|---|---|---|
| 100 | 15.8 | 3.05 |
| 90 | 16.9 | 3.15 |
| 80 | 18.8 | 3.38 |
| 70 | 21.3 | 3.60 |
| 60 | 28.3 | 3.80 |
| 50 | 32.5 | 4.25 |
| 40 | 37.8 | 5.00 |
| 30 | 44.0 | 5.60 |
| 20 | 52.9 | 5.60 |

RATIO OF POWER ABSORBED BY CONVENTIONAL BLADE TO THAT ABSORBED BY BLADE OF FIGS. 1 & 2

FIXED PITCH PROPELLER

This invention relates generally to aircraft propellers, and deals more particularly with an improved fixed pitch propeller designed to operate efficiently through a wide range of aircraft speeds.

BACKGROUND OF THE INVENTION

Prior art fixed pitch propellers can be designed to operate most efficiently either at climb speeds of the aircraft or below. In the alternative a conventional fixed pitch propeller can be designed to operate most efficiently at higher cruise speeds of the aircraft upon which they are installed. The purpose of the present invention is to provide an improved fixed pitch propeller which will operate efficiently in both regimes, and which will also exhibit improved performance of the aircraft upon which it is installed both at take off and at speeds in excess of cruise speed.

In aircraft equipped with conventional fixed pitch propellers the speed of rotation of the propeller is related to the throttle setting of the engine driving the propeller, and to the airspeed of the aircraft. A given propeller geometry will be most efficient at only one aircraft speed and at a particular engine speed. Variable pitch propellers that maintain a preset engine speed do overcome, and/or alleviate the inherent "single speed" design of conventional fixed pitch propellers. However, both fixed pitch propellers and variable pitch propellers are built on the premise that the relationship of blade pitch angle at a particular radial station of the blade is dictated primarily by the aircraft's forward speed, and engine speed, hence the station's blade rotational speed.

More specifically, fixed pitch propellers have traditionally been made with blade angles that are related to radial stations along the blade such that the trigonometric tangent of the blade angle ($\beta$) at a particular radial station is inversely proportional to the radial distance (R) of the station from the blade's rotational axis ($\tan\beta = {}^k\!R$). In a "cruise" prop this constant (k) is greater that it would be in a "climb" prop.

If we look at the helical path that the rotating propeller blade tip describes in space, for example, the "pitch distance" of the helix is a function of the propeller's speed, or more correctly velocity, and this velocity has a direction that is dictated by the rotational speed of the propeller and by the forward speed of the aircraft. The propeller is a rotating wing that generates lift (thrust) as it moves through the air. According to aerodynamic theory any wing has an optimum angle of attack that provides the highest ratio of lift (or thrust) to drag. Therefore, the propeller can only operate at optimum efficiency at a particular speed (corresponding to a particular forward speed and rotational speed). In a conventional fixed pitch propeller for example, the "pitch distance" of the ideal helix might be 72". This "pitch distance" is dictated by the blade angle at the tip, and this ideal helix also dictates blade angles at the various blade stations as described above. That is, tangent $\beta = {}^k\!R$.

SUMMARY OF THE INVENTION

The new fixed pitch propeller described herein does not have a single constant (k) that dictates the blade angle along the entire blade's radius. Instead, the swept disc area defined by the propeller (excluding the relatively unusable hub area) is split (half and half) so that an outboard portion (from 60%-75% blade station to the tip) has a "climb" prop constant (n) that is less than the constant (k) referred to in the preceding paragraph. An inboard portion of the blade (from 20% to 60% or 75%) has a "cruise" prop constant (m) that is greater than the constant (k), and greater than the constant (n) that defines the blade angle of the outboard portion.

Traditional fixed pitch single "constant" propellers generally represents a compromise between a "climb" prop and a "cruise" prop. Such a compromise tends to overload the engine in the low aircraft speed regime due to the fact that the blade is operating at an angle of attack that is higher than the angle for best efficiency (maximum lift or thrust to drag). The result is low engine speed (RPM) at take off and hence reduced horsepower available (since horsepower is directly proportional to RPM).

The compromised or traditional fixed pitch single "constant" propeller also tends to overspeed at high aircraft speeds due to the fact that the blade is operating at an angle of attack that is too low for best efficiency (maximum thrust to drag for the airfoil shape used). The result is high engine speed (RPM) at the high speed end of the aircraft's performance envelope. In fact, excessive RPM's limit top speed because engine damage can result unless the pilot reduces aircraft speed and/or engine speed in this situation.

In further accordance with the present invention, and in addition to the above described blade angle relationships for the inner and outer blade portions, another approach to optimizing the blade performance over a wider range of aircraft speeds is disclosed. The airfoil geometry also has an influence on optimum blade efficiency (optimum thrust/drag). More specifically, a wider airfoil chord dimension can also effect the angle of attack for best efficiency. When combined with the above described blade angle relationships for the inner and outer blade portions this change to the airfoil geometry from blade root to tip can be so chosen as to further enhance the efficiency of this unique blade.

DETAILED DESCRIPTION

A typical fixed pitch propeller of conventional geometry is generally fabricated with a blade angle that varies from the root to the tip according to the relationship tangent of blade angle equals ${}^K\!R$ where the blade angle is measured relative to a radial plane and where k is a constant and R the radius of the particular station along the blade where the blade angle is to be calculated.

In order to improve the performance of a conventional fixed pitch propeller at relatively low speeds the constant K can be made less than would be the case if the propeller were primarily designed for use at cruise speed. In short, the manufacturer and/or his customer must decide whether he will opt for a fixed pitch propeller that is most efficient at climb speed or in the alternative to install a fixed pitch propeller which is most efficient at cruise speed. Alternatively, the prop may be a compromise between these two design configurations.

The present invention seeks to obviate this dilemma on the part of both the manufacturer and the aircraft owner in that a fixed pitch propeller is provided which will operate efficiently in both the climb speed regime and in the cruise speed regime.

Figure 4:
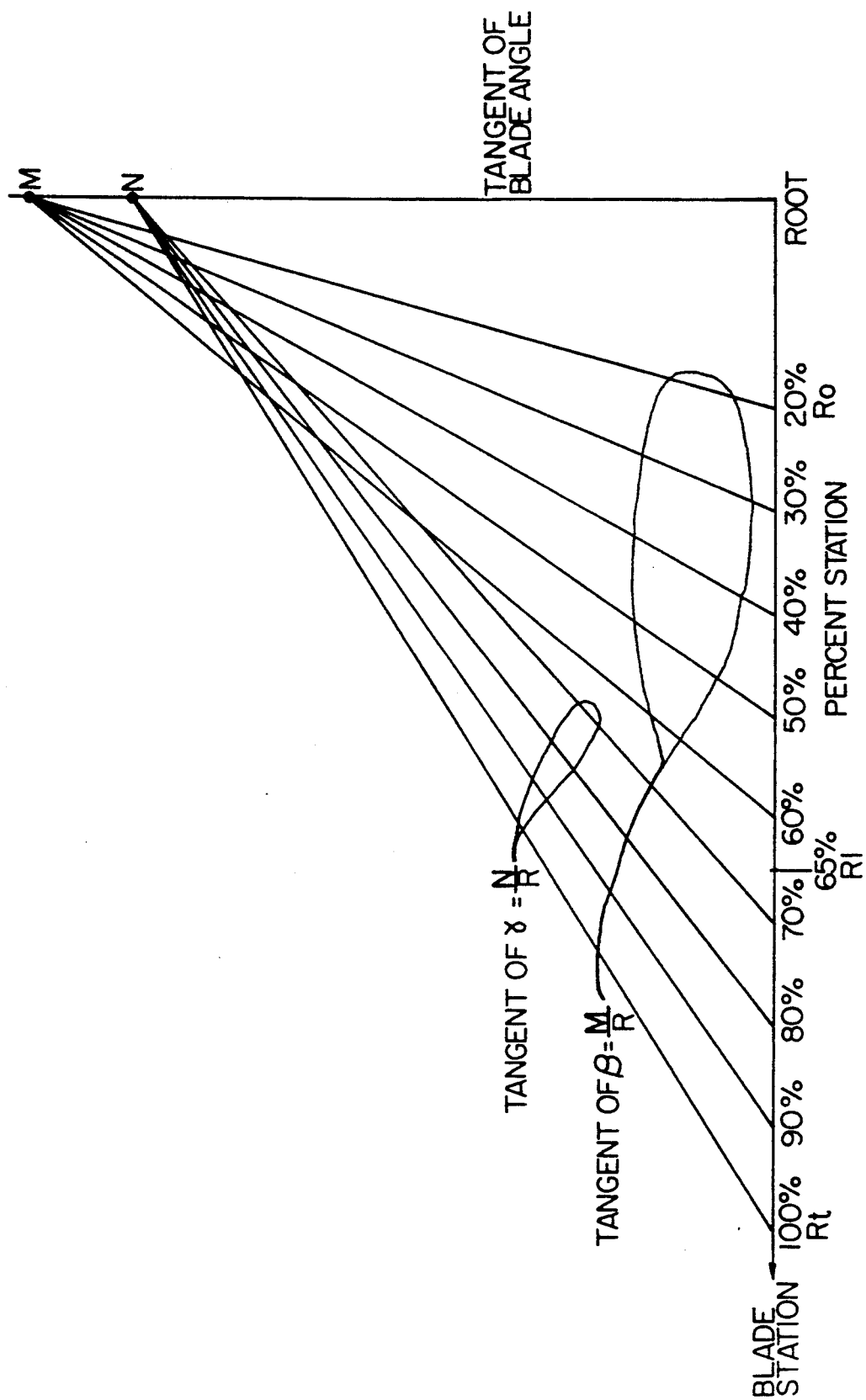
FIG. 4 is a graphical presentation of the relationship between the blade angle at various stations along the blade between the 20% and 100% radius of the blade.
Figure 5:
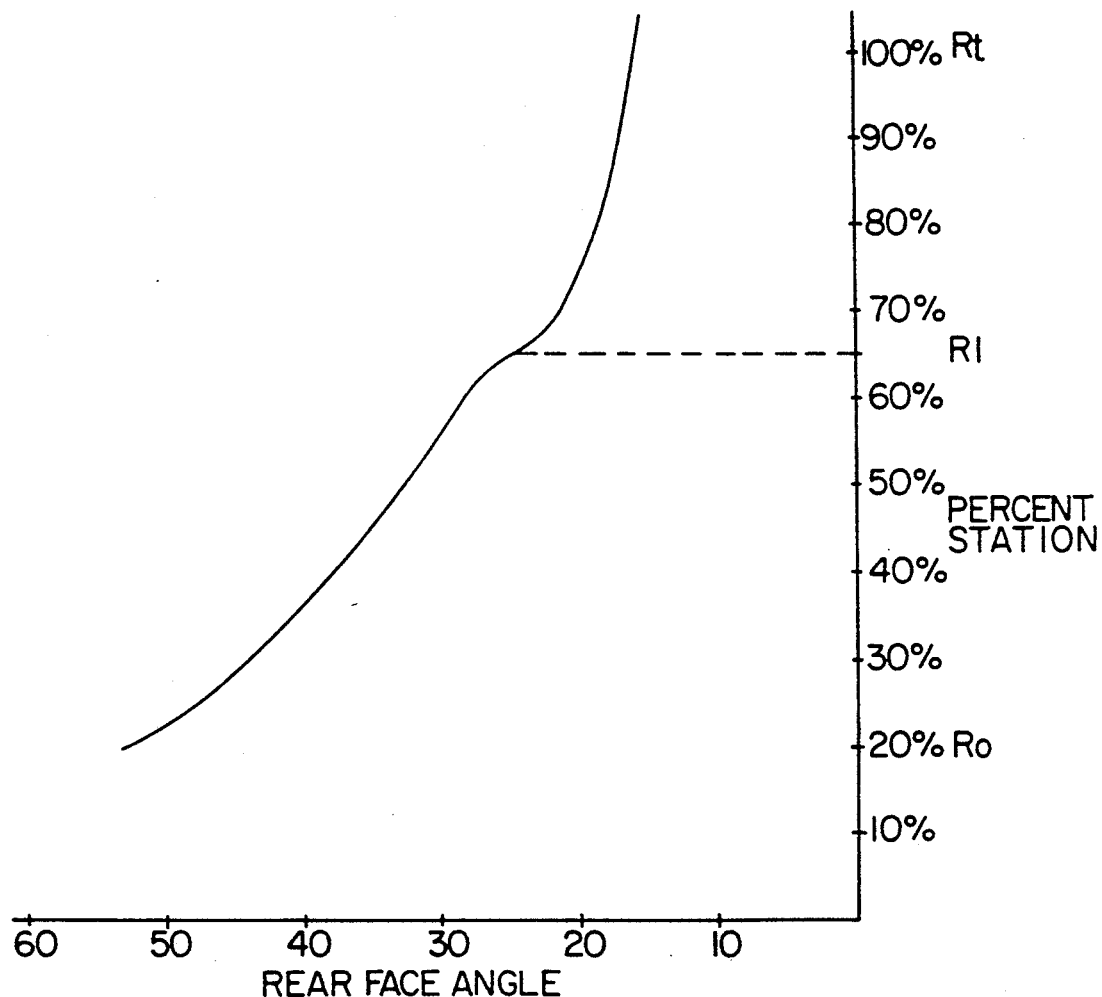
FIG. 5 is a schematic graphical illustration of the variation in "twist" of the blade from the root end of the blade Ro to the tip of the blade Rt.

The envelope of efficient operation for a fixed pitch prop according to the present invention is significantly expanded beyond that of a conventional fixed pitch propeller generally. Each propeller blade is provided with an inboard portion, extending generally from its 20% radius to its 60%-75% radius, with blade angles that are designed to permit efficient operation at cruise speeds or above. On the other hand from 65% to 100% radius the range of blade angles is so chosen that the propeller blade angles are most efficient at climb speeds. This combination not only provides for satisfactory operation in both speed regimes, but quite unexpectedly, also yields results that are significantly better than would be the case with conventional propeller blades of either climb or cruise speed configuration in both these speed regimes. FIG. 4 illustrates in graphic fashion the relationship between these inboard and outboard portions of a typical propeller blade.

Figures 1, 2:
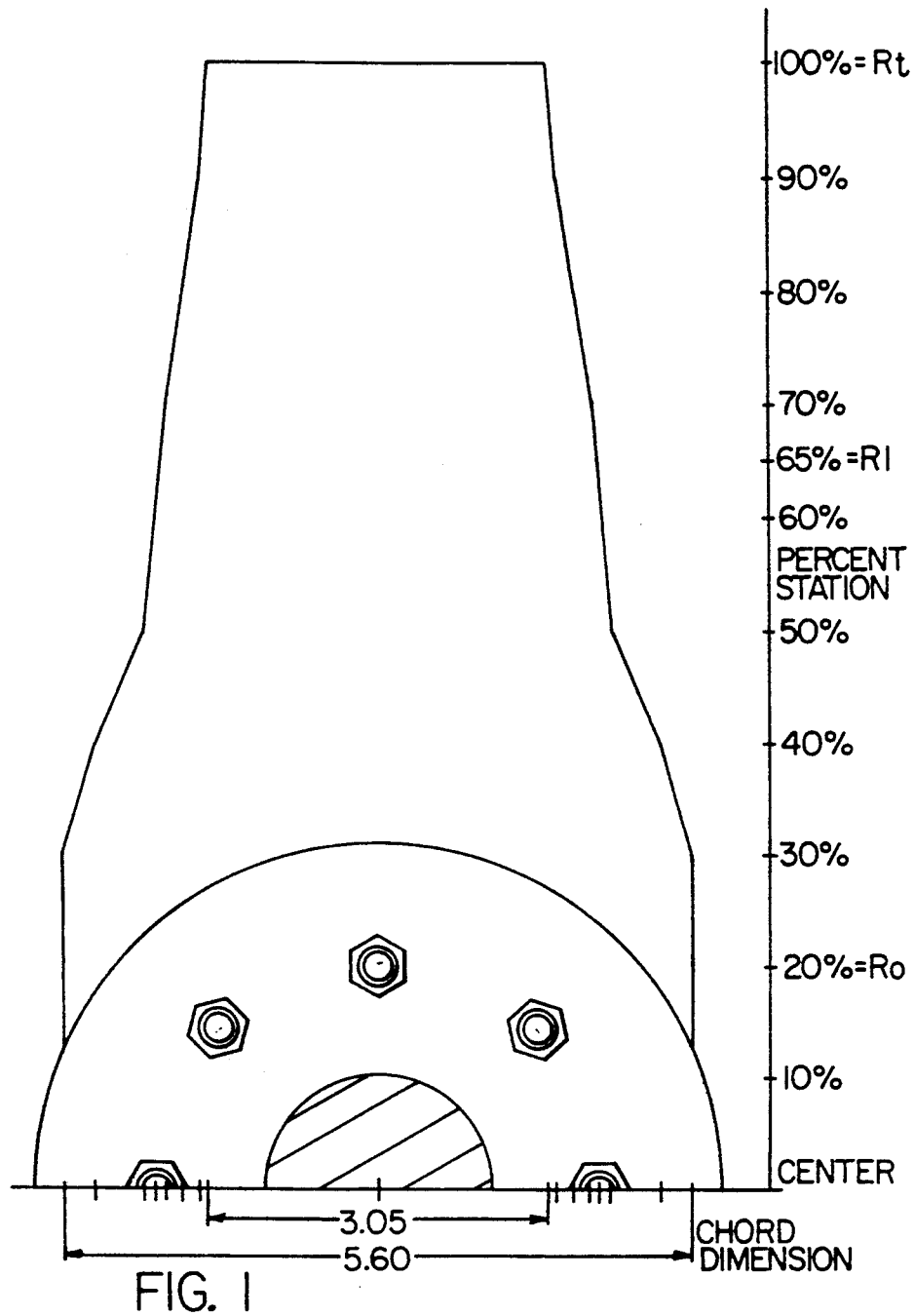
FIG. 1 is a plan view of a prototype blade from the 20% radius or station to the 100% radius or tip station, and illustrates the blade profile with reference to the axis of rotation.
FIG. 2 is a tabular presentation of the specific dimensions depicted in FIG. 1.
Figure 3:
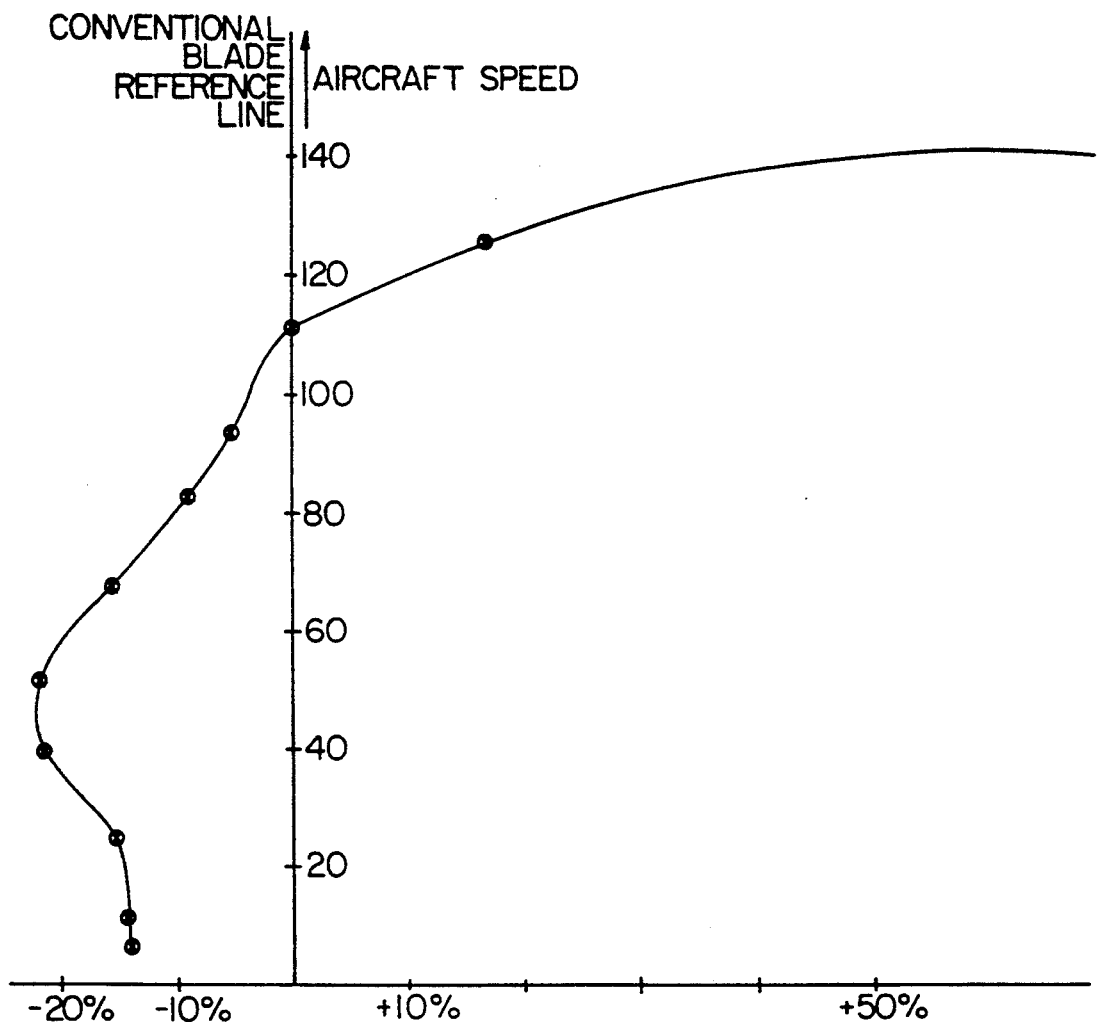
FIG. 3 is a graphical presentation of the ratio of the power absorbed by a conventional fixed pitch propeller blade to that absorbed by the blade of FIGS. 1 and 2 (and assumes that all available brake horsepower is absorbed by the propeller at the speeds indicated at the left hand side of this view).

Turning next to the specific example illustrated in FIGS. 1, 2 and 3 a propeller blade has been constructed in accordance with the present invention and actual tests have substantiated the theoretical results illustrated in FIG. 3. These results have been compared with a conventional fixed pitch propeller in FIG. 3. This comparison, though analytical in nature, is based upon the ability of the propeller to absorb engine power at various speeds. It should be observed that a conventional fixed pitch propeller will cause engine RPM to vary not only as a result of throttle setting but also as a result of aircraft speed. Therefore, at takeoff speed full RPM for the engine installation provided in a typical light aircraft may not be achieved until a speed far above takeoff speed with a conventional fixed pitch propeller. By the same token, at cruise speeds and higher the conventional fixed pitch propeller will create a situation where engine RPM can be excessive. In accordance with the present invention a propeller blade constructed as suggested in FIGS. 1, 2 and 3 will at take off and in climb have most of the engine horsepower absorbed by the outer blade portion from the 65% to the 100% radial station, and considerably less air will be drawn through the inboard portion of the blade due to the fact that the blade angles at the inboard stations are operating at angles of attack well above the angles associated with maximum efficiency. That is, the ratio of lift to drag (or propeller thrust to drag) will not be optimized in the inboard portion of the rotating propeller disc.

As speed increases, generally after the aircraft has climbed to its cruising altitude, the relative efficiency of the inboard portion of the propeller blade will be greatly improved. In fact, the outboard portion becomes totally inefficient and the outboard portion of the propeller blade will be unloaded in cruise even as the inboard portion of the blade was unloaded during takeoff and climb.

As a result of the unloaded portions of the blade being operated at zero angle of attack the engine power is totally available for the efficiently operating inboard "cruise" portion of the prop at higher cruise speeds. This result has the effect of permitting full throttle operation of the aircraft even at speeds well above cruise speed. Such a result has not been possible heretofore due to the fact that the engine speed would exceed the maximum recommended by the manufacturer if the aircraft were operated at high speed and at full throttle.

From FIG. 3 it will be apparent that the available brake horsepower will be more effectively utilized in a fixed pitch propeller constructed in accordance with the present invention, particularly at higher speeds. This has been substantiated by actual flight test, and the level flight cruising speed of a typical light airplane has been increased significantly when the airplane is equipped with a propeller constructed in accordance with the teachings of FIGS. 1 and 2.

From FIG. 4 it will be apparent that the preferred embodiment of the present invention provides a propeller blade having two different formulas to define the blade angle along its length. More specifically, an inboard blade portion from the 20 percent blade station to approximately the 60 percent blade station has a blade angle ($\beta$). The tangent of the blade angle ($\beta$) equals m divided by R where m is a constant somewhat greater than the constant generally used for present day fixed pitch propellers generally. From the tip of the propeller to the intermediate blade station referred to previously, the tangent of the blade angle ($\gamma$) is equal to a constant n divided by the radial distance to the particular station on the blade which is being calculated. This constant n is somewhat less than the typical constant normally provided in a conventional fixed pitch propeller generally. Preferably, the relationship between m and n is such that m is approximately 10 percent greater than n.

I claim:

1. A fixed pitch propeller having a blade with a root end adapted for attachment to a rotatable hub assembly, said blade having an inboard portion connected to said root end and extending radially outwardly to a first blade station said inboard portion having an air-foil shape and being twisted such that the blade angle varies from said root end to said first blade station according to the relationship tangent $\beta = {}^m\!R$ where m is a first constant and R represents the radial station of the blade relative to the blade axis of rotation, said blade having an outboard portion connected to said inboard portion at said first blade station, said outboard blade portion having a blade angle that varies from said first station to the blade tip (Rt) according to the relationship tangent $\gamma = {}^n\!R$ where n is a second constant and R represents the radial station from R1 to Rt, said first constant m being greater than said second constant n.

2. The combination of claim 1 wherein R1 equals a percentage of Rt in the range between 65% to 75%.

3. The combination according to claim 1 wherein m is approximately 10% greater than n.

4. The combination according to claim 1 wherein said inboard blade portion has a chordwise dimension C that varies from a maximum at said root end Ro to a minimum at the blade tip.

* * * * *